United States Patent [19]

Mainquist et al.

[11] Patent Number: 5,046,592

[45] Date of Patent: Sep. 10, 1991

[54] SERVO SHIFT CONTROL FOR A FORWARD/REVERSE MECHANISM

[75] Inventors: James K. Mainquist, Clarkston; Robert C. Downs, Ortonville; Larry T. Nitz, Troy, all of Mich.

[73] Assignee: Saturn Corporation, Troy, Mich.

[21] Appl. No.: 593,728

[22] Filed: Oct. 5, 1990

[51] Int. Cl.⁵ .............................................. B60K 41/22
[52] U.S. Cl. .............................. 192/3.58; 192/3.57; 192/48.91; 192/51; 192/85 C; 74/377
[58] Field of Search ................... 192/3.57, 3.58, 85 R, 192/85 C, 87.11, 87.13, 87.14, 87.18, 48.5, 48.91, 51; 74/377

[56] References Cited

U.S. PATENT DOCUMENTS

| | | | |
|---|---|---|---|
| 2,137,953 | 11/1938 | Rowley | 192/3.57 |
| 2,137,959 | 11/1938 | Turek | 192/3.57 |
| 2,189,679 | 2/1940 | Sanford | 192/3.57 |
| 3,001,413 | 9/1961 | Burckhardt | 192/87.14 |
| 3,386,543 | 6/1968 | Osburn | 192/3.57 |
| 3,422,939 | 1/1969 | Henry-Biabaud | 192/3.57 |
| 3,557,918 | 1/1971 | Akima et al. | 192/3.57 |
| 3,752,282 | 8/1973 | Espenshied | 192/3.58 X |
| 4,697,677 | 10/1987 | Janiszewski | 192/87.14 X |

FOREIGN PATENT DOCUMENTS

| | | | |
|---|---|---|---|
| 61-256027 | 11/1986 | Japan | 192/3.58 |
| 238203 | 10/1945 | Switzerland | 192/87.14 |

Primary Examiner—Allan D. Herrmann
Assistant Examiner—Andrea Pitts
Attorney, Agent, or Firm—Donald F. Scherer

[57] ABSTRACT

A mechanical clutch is provided to selectively interconnect a forward or reverse gear member to a transmission shaft. The clutch is operated by a servo piston and fork structure. The servo piston is slidably disposed in a housing and urged in the forward select position by a spring. The housing and servo piston cooperate to define two fluid chambers which are maintained in a separated condition when the forward select position is established. One chamber is in fluid communication with a fluid system that is controlled to provide fluid at two distinct pressure levels, depending upon various vehicle operating parameters. The other chamber is connected with a selectively engageable fluid operated friction clutch which is effective to assist in establishing at least the reverse drive ratio within the transmission. The lowest level of fluid pressure in the one chamber is not sufficient to cause the piston to overcome the spring force and thereby move the clutch to the reverse select position. The second pressure level is, however, sufficient to cause such movement. In the reverse select position, the chambers are fluidly interconnected and the fluid clutch can be engaged by the fluid pressure supplied through the second chamber from the first chamber.

3 Claims, 5 Drawing Sheets

SERVO SHIFT CONTROL FOR A FORWARD/REVERSE MECHANISM

BACKGROUND OF THE INVENTION

This invention relates to servo mechanisms, and more particularly, to servo mechanism for controlling the shifting of a transmission between a forward ratio and a reverse ratio.

The use of countershaft type transmissions as automatic shifting transmissions is increasing. Such transmissions, as is well known, are generally structurally similar to manually shifted transmissions wherein the synchronizer type clutches have been replaced with fluid operated type clutches. The one remaining mechanical clutch in these systems is generally utilized during forward or reverse operation to establish drive connection between the lowest forward ratio gear and the output shaft and the reverse ratio gear and its meshing idler. Also, these clutches are generally dog type or jaw clutches which do not incorporate a synchronizer. Therefore, it is somewhat important that the gears and the shaft be either rotating at the same speed or that both are stationary.

SUMMARY OF THE INVENTION

The present invention provides a control system and a mechanical forward/reverse clutch mechanism which ensures that a minimum speed differential, between a reverse gear member and a transmission shaft, is present prior to engaging the mechanical clutch between the transmission shaft and the reverse gear member.

A shift control structure includes a servo member operatively connected with a portion of the mechanical clutch to provide for the shifting of the clutch. The servo includes a piston member which cooperates with a housing to provide two fluid chambers which are selectively disposed for controlled fluid communication.

In the forward select position, the chambers are disconnected and in the reverse select position, the chambers are interconnected. The servo is urged to the forward select position by a spring member which has sufficient precompression to resist the movement of the piston to the reverse select position prior to the fluid pressure in one of the chambers being increased above a desired threshold level.

The fluid pressure which is supplied to the chamber is provided by an electro-hydraulic control system which includes a microprocessor and a line pressure regulator. The microprocessor evaluates various vehicle parameters including engine speed, engine torque and vehicle speed. These parameters are evaluated by the microprocessor in a manner to establish a voltage signal to a pulse-width-modulated valve which controls the line pressure for the transmission hydraulic components in accordance with the duty cycle of the signal.

If the vehicle speed, for example, is above a certain value and the forward to reverse shift is commanded by the operator, the line pressure will not be sufficient to cause the servo piston to move against the compression spring. Accordingly, a forward/reverse shift will not occur and, as a general rule, the transmission will be placed in neutral by exhausting the various friction clutches.

The microprocessor, as is well known, continuously monitors the operating parameters and the operating requests, such that when the vehicle speed, for example, has been reduced below a threshold value, the line pressure will be increased sufficiently to cause the servo piston to move to the reverse select position and therefore selectively clutch the transmission shaft to the reverse gear. After the reverse select position has been attained, the two chambers are fluidly interconnected and a fluid pressure in the second chamber is directed to a friction clutch and a control valve to establish or otherwise enforce the engagement of the friction clutch which will condition the transmission for reverse drive operation.

It is therefore an object of this invention to provide an improved forward/reverse servo shift controller in which a forward to reverse shift is not possible when at least one vehicle operating parameter is above a predetermined threshold value.

It is another object of this invention to provide an improved forward/reverse shift control having a dual area piston in which one area thereof is in fluid communication with the line pressure which is controlled to at least two pressure levels, the first of which is not sufficient to cause movement of the piston and the second of which is sufficient to cause such movement, and further wherein, the line pressure level is controlled by a vehicle operating parameter which maintains the line pressure at the low level until a predetermined threshold value is present.

These and other objects and advantages of the present invention will be more apparent from the following description and drawings.

DESCRIPTION OF THE EXEMPLARY EMBODIMENT

Figure 1:
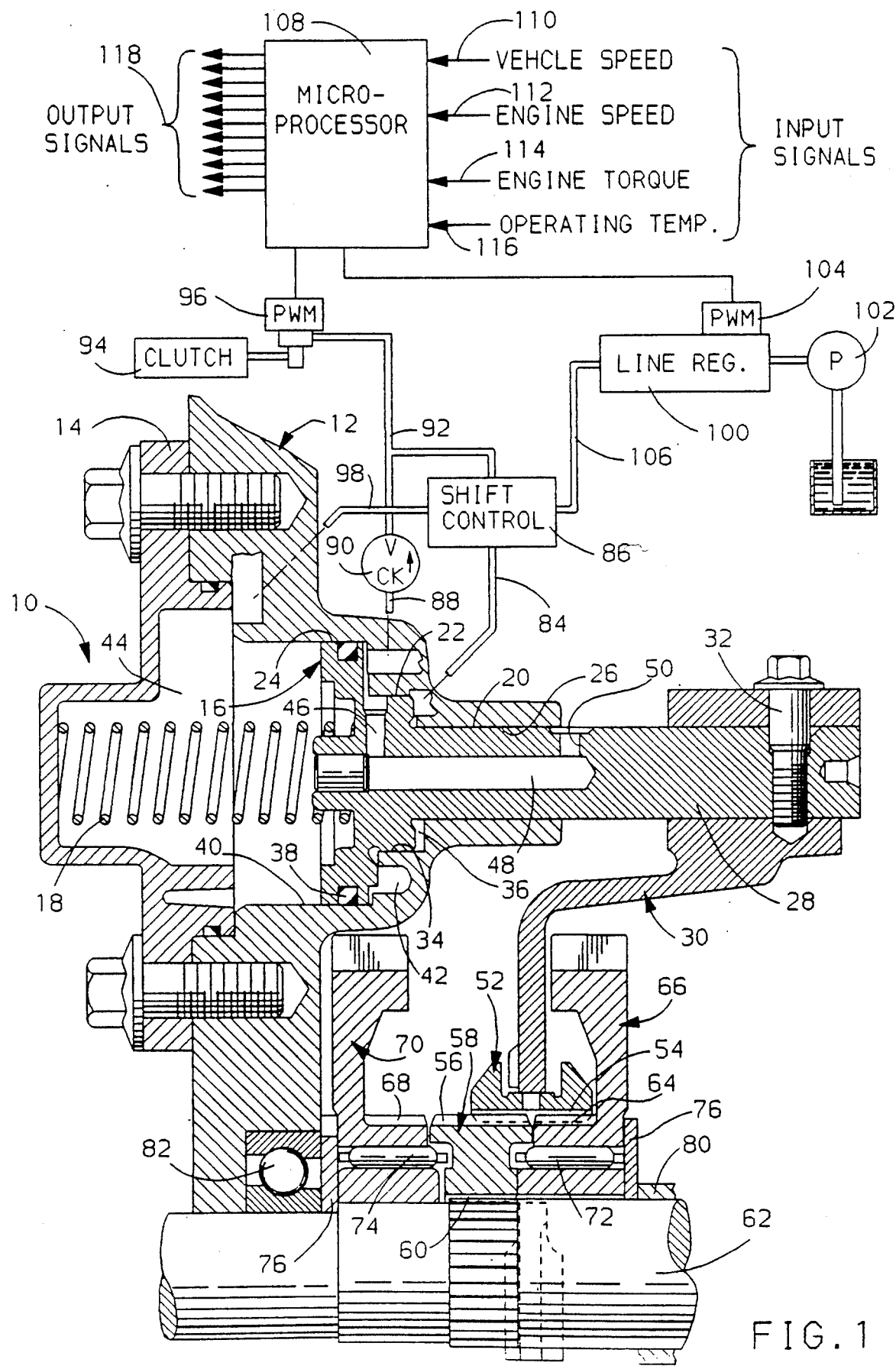
FIG. 1 is a cross-sectional view of a portion of a transmission gear mechanism and shift controller and a schematic representation of an electro-hydraulic control mechanism.
Figure 2:
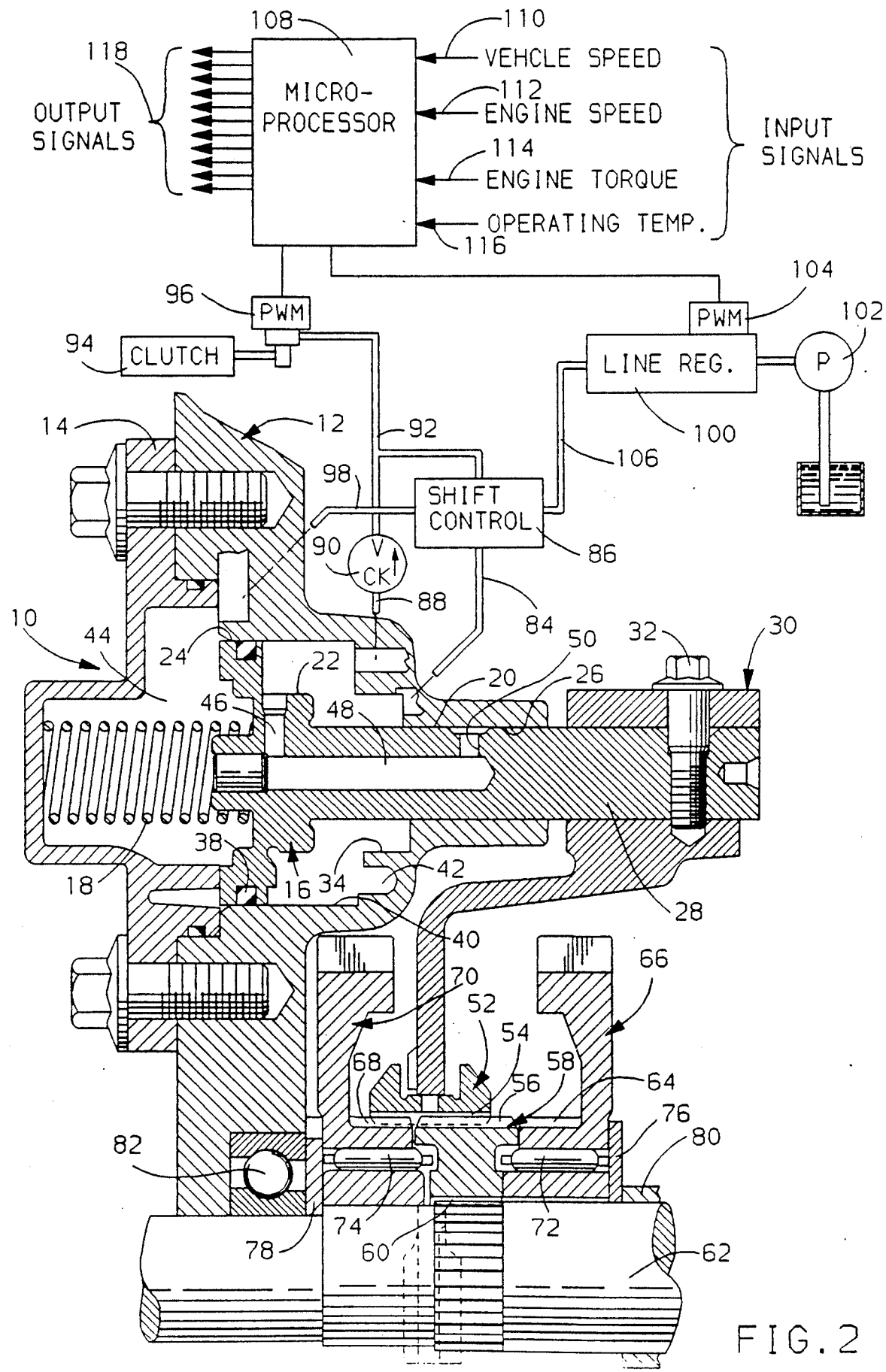
FIG. 2 is a view similar to FIG. 1, wherein the shift control mechanism is shown in an alternate position.

Referring to the drawings, and more particularly to FIGS. 1 and 2, there is seen a forward/reverse shift controller or servo, generally designated 10, which includes a casing or housing 12, an end cover 14, a piston 16 and a compression spring 18. the piston 16 is slidably disposed in the housing 12 and is urged rightward to the position shown in FIG. 1 by the spring 18 which is compressed between the casing 12 and the cover 14.

The piston 16 has three circumferentially extending surfaces 20, 22 and 24. Circumferential surface 20 is slidably sealingly engaged in a bore 26 formed in the casing 12 and forms the outer surface for a piston rod 28, which has secured thereto a shift fork 30 by means of a threaded fastener 32. The circumferential surface 22 sealingly engages a surface 34 formed on the casing 12 and cooperates therewith to define a fluid chamber 36. The circumferential surface 24 has disposed thereon a seal member 38 which cooperates with a surface 40 formed on the casing 12 to define a chamber 42 and a chamber 44. The chamber 42 is formed on the same side of the piston 16 as the chamber 36 and the chamber 44 is disposed on the opposite side of the piston 16.

The circumferential surface 22 is in fluid communication with a radial passage 46, an axial passage 48 and another radial passage 50. The radial passage 50 is open to exhaust in the position shown in FIG. 1, which thereby exhausts the fluid pressure in chamber 42.

In the position shown in FIG. 2, the radial passage 50 is sealed by the sealing engagement between the circumferential surface 20 and bore 26. In fact, the radial passage 50 is disposed to be closed from atmosphere when the circumferential surface 22 is moved out of sealing engagement with the surface 36.

The shift fork 30 is operatively connected to an annular clutch sleeve 52 which has a splined inner diameter 54. The splined inner diameter 54 is adapted to mesh continuously with a splined outer diameter 56 of a clutch hub 58, which in turn, is drivingly connected through a splined connection 60 with a transmission shaft 62.

The splined inner diameter 54 of clutch sleeve 52 is also selectively engageable with a spline 64 formed on a forward gear 66, as seen in FIG. 1, and with a spline 68 formed on a reverse gear 70, as seen in FIG. 2. The gears 66 and 70 are rotatably supported on the transmission shaft 62 by bearing members 72 and 74, respectively.

From the above description, it should be apparent that the gear 66 is drivingly connected with the shaft 62 when the servo 10 is in the forward select position shown in FIG. 1. It should also be obvious that in this position, the reverse gear 70 is freely rotatable on the shaft 62. It should likewise be apparent that when the servo 10 is moved to the reverse select position shown in FIG. 2, that the gear 70 is drivingly connected to the transmission shaft 62 while the gear 66 is freely rotatable on the shaft 62. The gears 66 and 70, and clutch clutch hub 58 are controlled to their axial positions on the shaft 62 by a pair of thrust bearings 76 and 78 which are disposed between a sleeve shaft 80 and bearing 82, respectively.

The fluid chamber 36 is in fluid communication with a reverse shift signal passage 84 which receives a selective signal from the conventional shift controller 86. the chamber 42 is in fluid communication with a clutch fill passage 88 which is in fluid communication through a one-way or check valve 90 with a clutch valve passage 92. The clutch fill passage 92 is selectively pressurizable to control the engagement of a conventional fluid operated friction clutch 94. The fluid pressure in the friction clutch 94 is controlled by a conventional pulse-width-modulator type solenoid valve 96. The check valve 90 will prevent fluid flow from the passage 92 to exhaust through the passages in rod 28 when the forward select position is established. Thus, the clutch 94 can also be used for a forward ratio.

The chamber 44 is in fluid communication with a pressure passage 98 which is pressurized by the shift controller 86 and at least the first or lowest forward speed transmission operation. The shift controller 86 receives fluid pressure from a line pressure regulator valve 100 which is supplied by a conventional positive displacement pump 102. The line pressure regulator valve 100 is a conventional valve which is controlled by a conventional pulse-width-modulated solenoid valve 104 to establish a controlled pressure level in a passage 106 which is connected with the shift controller 86.

The pulse-width-modulated solenoid valves 96 and 104 are controlled by a conventional microprocessor or digital computer 108. The microprocessor is effective to receive input signals, such as vehicle speed 110, engine speed 112, engine torque 114 and operating temperature 116. Obviously, other vehicle parameters can be input to the microprocessor 108 depending upon the program which is to be exectued by the microprocessor 108.

As is well known, the microprocessor 108 is effective to provide output signals, in accordance with its programming, and input signals which can be utilized to control the pulse-width-modulated valves 104 and 96, as well as shift control functions, which are represented by a variety of output signals 118.

The microprocessor 108 is effective to control the line pressure regulator valve 100 to establish at least two distinct pressure levels in the passage 106 and therefore in the passage 84. As an example, the pressure level in passage 84 can be controlled at a low level, for example, 450 kpa, and at a high level, for example, 900 kpa. At the low level, the fluid pressure in chamber 36 is not sufficient to overcome the precompression force in spring 18 and therefore servo 10 will remain in the forward select position shown in FIG. 1. However, when the pressure level in passage 84 is at the higher level, the fluid pressure in the chamber 36 is sufficient to cause movement of the servo 10 from the forward select position of FIG. 1 to the reverse position of FIG. 2.

When the circumferential surface 22 clears the surface 34, the fluid in chamber 36 is connected to the fluid in chamber 42 and via passages 88 and 92, to the clutch 94. The clutch 94 will in turn be selectively engaged at a pressure level established by the pulse-width-modulated valve 96. When the circumferential surface 22 has cleared the surface 34 and the chambers 36 and 42 are interconnected, the fluid pressure in passage 84 can, if desired, be reduced to the low level since the combined area of chambers 36 and 42 will be sufficient at the low pressure level to resist the force in spring 18.

The pressure level in passage 84 is controlled such that if the operator commands or requests a forward to reverse shift, the command will not be acted upon unless certain vehicle parameters are at or below a predetermined threshold. The microprocessor 108 operates in accordance with its programming to establish the pressure level in passage 106 and therefore passage 84.

Figure 3:
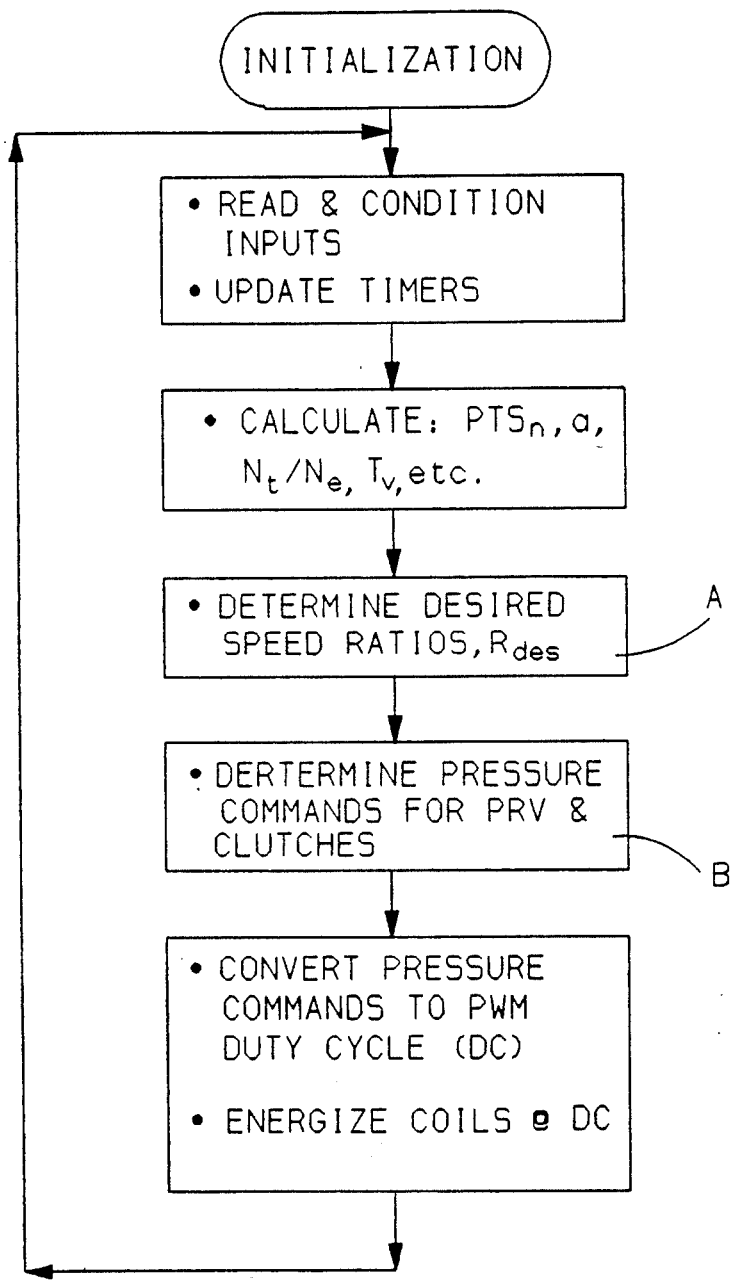
FIGS. 3 through 6 are block diagrams of a portion of the operating sequence of a microprocessor utilized to control the fluid pressure and shift control functions of the transmission.

The process of the algorithms for the microprocessor 108 is shown in FIGS. 3 through 6 and is somewhat self-explanatory. As seen in FIG. 3, the microprocessor undergoes an initialization process at start up which establishes the various constants in the parameters needed within the system. It then evaluates or interrogates the input signals and calculates various operating parameters.

The processor then evaluates any operator commands which might be requesting a ratio change. Following the evaluation of these commands, the microprocessor establishes the pressure levels for the active clutches and then provides for these pressure levels by energizing the required pulse-width-modulated solenoids. This process is repeated on a conventional interrupt basis.

Figure 4:
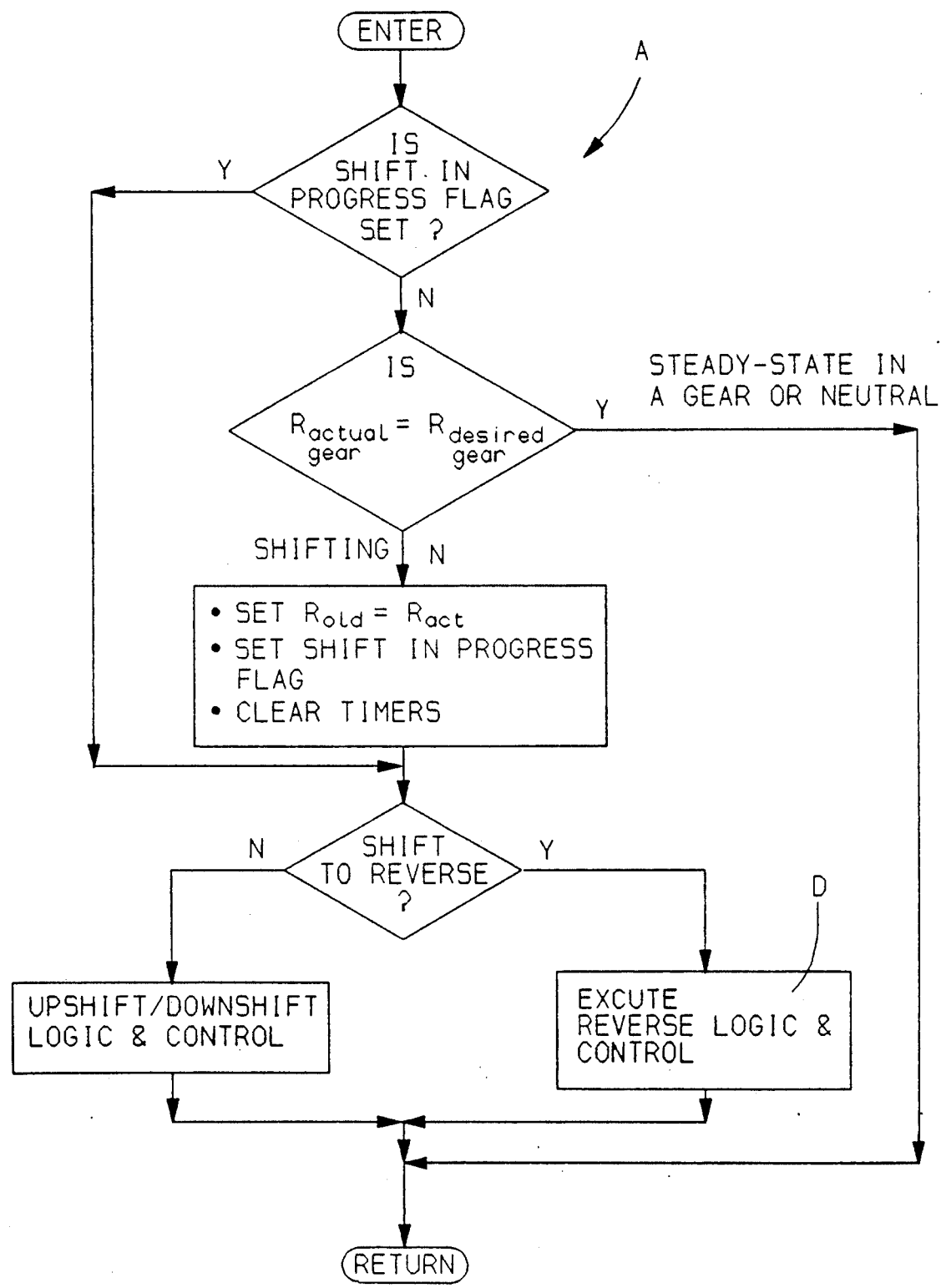

If a shift has been commanded by the operator, the microprocessor will follow the programming steps shown in FIG. 4 in which it is determined whether the shift command was a forward to reverse command. If a forward/reverse command is present, the microprocessor performs the control steps shown in FIG. 5.

Figure 5:
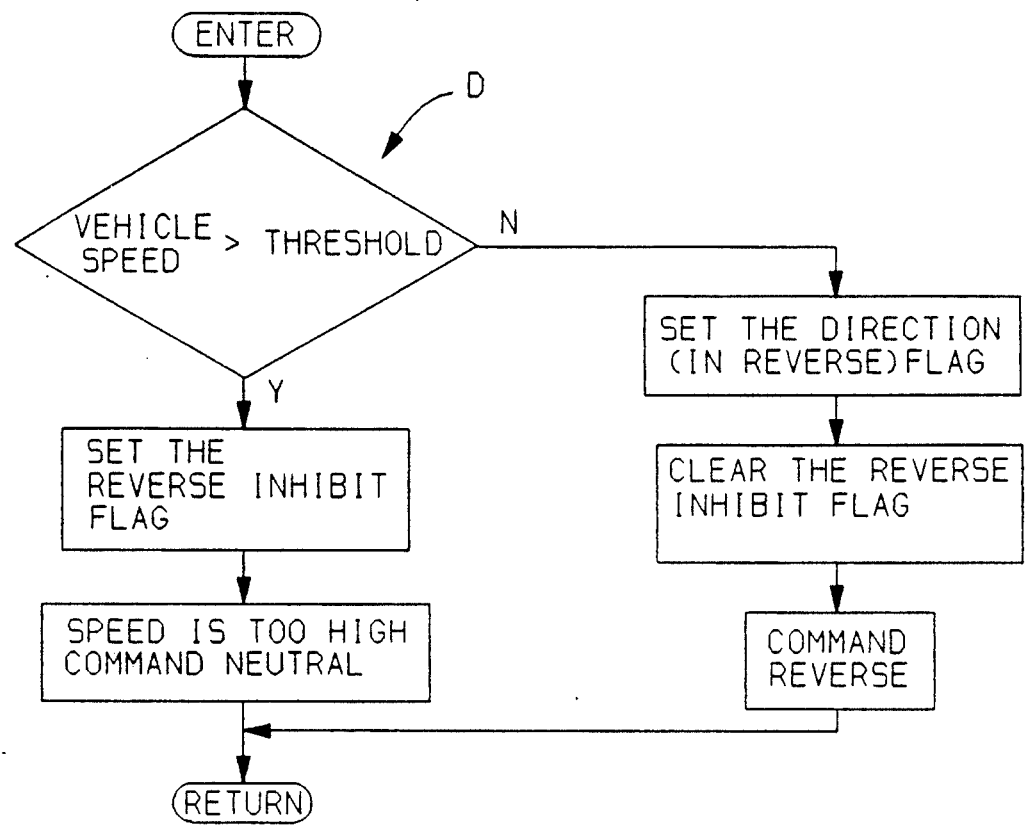

As seen in FIG. 5, the microprocessor 108 evaluates the vehicle speed to determined if, in fact, the speed is below a threshold value. If the vehicle speed is above the threshold value, the microprocessor sets a reverse inhibit flag and commands a neutral condition within the transmission.

Figure 6:
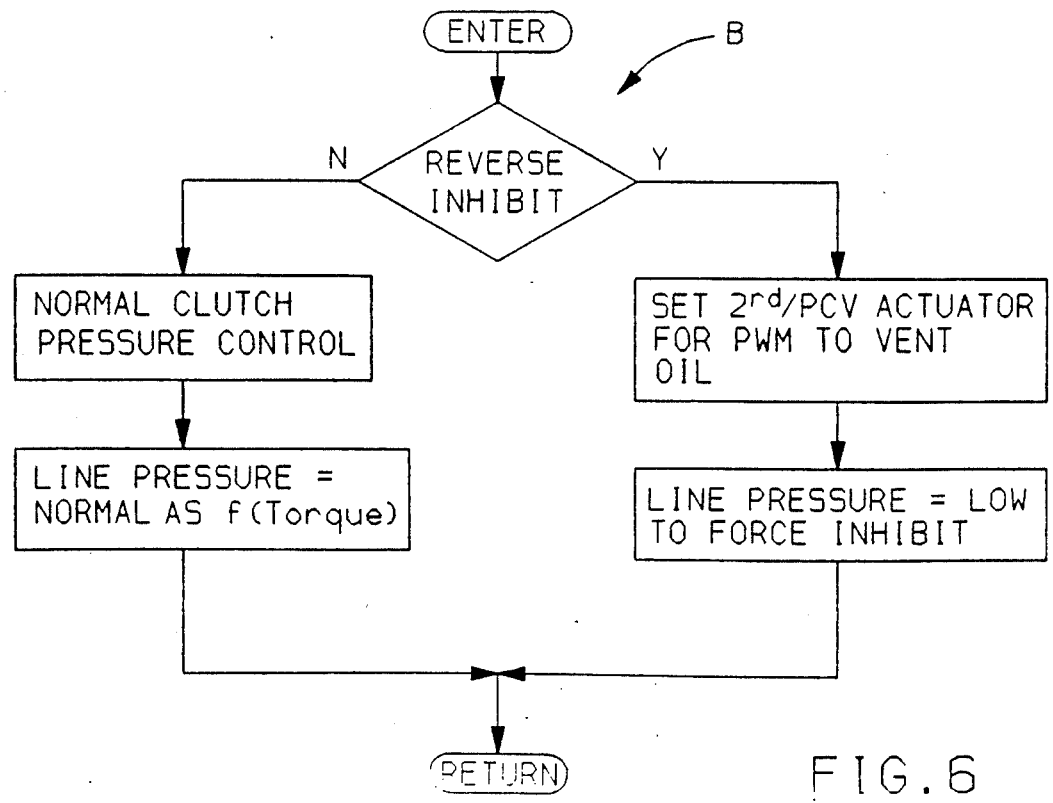

The microprocessor 108 then executes the commands, as shown in FIG. 6, and with a reverse inhibit flag set, the pulse-width-modulator 96 will be set to establish a zero or exhaust pressure level and the pulse-width-modulator 104 will be set to establish a low level pressure at passage 106. The microprocessor 108 will complete the steps shown in FIG. 3 and proceed to re-evaluate the system.

If the operator has commanded a forward/reverse shift, and vehicle speed decreases below the threshold value, the microprocessor 108 will perform the steps shown in FIG. 5 in which the reverse inhibit flag is cleared and a command for reverse shift is set. With this condition, the microprocessor 108 will evaluate the steps shown in FIG. 6 which will result in the higher pressure level being established in passages 106 and 84. The microprocessor will then adjust the duty cycles of the pulse-width-modulators 106 and 104 accordingly, so that a forward to reverse shift will occur.

It should be appreciated from the foregoing discussion and description of operation that the splined connections between the clutch sleeve 52 and the reverse gear 70 will not undergo significant shock loading during a forward to reverse shift since the servo 10 will prevent such shifting until the proper vehicle parameters are present.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A forward/reverse servo controller in a shift mechanism comprising: a shaft; forward gear means; reverse gear means; clutch means including shift fork means movable to a first position for connecting said forward gear means to said shaft and to a second position for connecting said reverse gear means to said shaft; fluid operated piston means for controlling movement of said shift fork means between said first and second positions; housing means for enclosing said piston means and cooperating therewith to form a first fluid chamber on one side of said piston means, a second fluid chamber on the one side of said piston means; spring means disposed between said housing means and said piston means for urging said piston means to move said shift fork to said first position and to position said piston means in said housing means with said first chamber sealed from fluid communication with said said second chamber; and fluid pressure source means selectively connectible with said first chamber for providing a fluid pressure controlled at a first pressure level insufficient to move said piston means against said spring means and controlled at a second level pressure sufficient to move said piston means against said spring means to move said shift fork to said second position and to establish fluid communication between said first and second chambers, and said first pressure level then being sufficient to maintain said piston means and said shift fork in said second position.

2. The invention defined in Claim 1 further including fluid operated clutch means for establishing a reverse ratio; and the second chamber being in fluid communication with said fluid operated clutch means, and the fluid operated clutch means being engaged by fluid pressure delivered through said second chamber from said first chamber.

3. A forward/reverse servo controller in a shift mechanism comprising: a shaft; forward gear means; reverse gear means; clutch means including shift fork means movable to a first position for connecting said forward gear means to said shaft and to a second position for connecting said reverse gear means to said shaft; fluid operated piston means for controlling movement of said shift fork means between said first and second positions; housing means for enclosing said piston means and cooperating therewith to form a first fluid chamber on one side of said piston means, a second fluid chamber on the one side of said piston means and a third chamber on an opposite side of said piston means; spring means disposed between said housing means and said piston means for urging said piston means to move said shift fork to said first position and to position said piston means in said housing means with said first chamber sealed from fluid communication with said said second chamber; and fluid pressure source means selectively connectible with said first chamber for providing a fluid pressure controlled at a first pressure level insufficient to move said piston means against said spring means and controlled at a second level pressure sufficient to move said piston means against said spring means to move said shift fork to said second position and to establish fluid communication between said first and second chambers, and said first pressure level then being sufficient to maintain said piston means and said shift fork in said second position and said fluid pressure source means being selectively connectible with said third chamber for providing a controlled pressure to said third chamber to assist said spring means to move said piston means and said shift fork means to said first position.

* * * * *